(12) United States Patent
Rindsig et al.

(10) Patent No.: US 6,262,816 B1
(45) Date of Patent: *Jul. 17, 2001

(54) SCANNER START AND STOP

(75) Inventors: Michael Rindsig, Frederiksberg; Jørgen Rasmussen, Lyngby, both of (DK)

(73) Assignee: Context A/S, Allerod (DK)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/072,878

(22) Filed: May 5, 1998

(51) Int. Cl.$^7$ ........................................................ H04N 1/04
(52) U.S. Cl. ............................ 358/498; 358/413; 358/498
(58) Field of Search ...................... 358/413, 498, 358/448, 505, 530, 408, 474, 486, 494, 496

(56) References Cited

U.S. PATENT DOCUMENTS 5,703,968 * 12/1997 Kuwahara ............................ 382/269
5,710,634 * 1/1998 Kuriyama ............................ 358/296
5,943,139 * 8/1999 Tang .................................... 358/412

* cited by examiner

Primary Examiner—Jerome Grant, II
Assistant Examiner—Negussie Worku
(74) Attorney, Agent, or Firm—Merchant & Gould P.C.

(57) ABSTRACT

There is provided an optical scanner collecting information from an original by means of sweeping scan. The scanner comprises a memory working as a buffer between the scanner and an external unit receiving data from the scanner. According to the invention and in order to reduce mechanical vibrations from displacement means displacing the original relative to the scanner at a feed rate, the scanner comprises control means for controlling the magnitude of the feed rate. The feed rate is adjusted according to a procedure comprising a first step: if the memory has capacity for a higher data rate and if said feed rate is less than a preferred value, then said feed rate is increased by a value that is a fraction of said preferred value. Further, the scanner may comprise a data processor for maintaining a preferred line resolution while the feed rate is below the predetermined value.

31 Claims, 8 Drawing Sheets

SCANNER START AND STOP

FIELD OF THE INVENTION

The present invention relates to an optical scanner using sweeping scan.

BACKGROUND OF THE INVENTION

Optical scanners are capable of producing a representation of the image of an original by projecting an image of the original onto an optical sensor by means of an optical system. The optical sensor thereby provides a signal which represents the image of the original, or a part thereof as intensity levels.

In a practical embodiment the optical sensor is provided as a line detector. But, due to the fact that a line detector is capable of imaging only one scan line on the original at a given point in time, the original is moved past the line detector at a feed rate in order to obtain an image of the entire original, that is the original is scanned. Alternatively the line detector may be moved past the original at a given feed rate.

Various types of photosensor devices may be used as a line detector, e.g. charge coupled devices (CCD's). A CCD builds up an electrical charge in response to the exposure to light. The magnitude of the electrical charge built up is dependent on the intensity are the duration of the light exposure. The intensity of a picture element (pixel) on the original is imaged by a CCD cell. The charge built up in each CCD is sampled and discharged at sampling intervals. Typically the CCD's axe sampled at regular sampling intervals, i.e. at a constant sampling rate. Each sample represents the imaged intensity of a pixel.

The object of scanning an original is to detain a digital representation of the information comprised by the original. The digital representation it typically stored or otherwise processed on a computer that has access to some type of storage media e.g. a harddisc drive. The computer is typically involved in executing a number of different tasks that require varying computational efforts. The computer is thus exposed to a varying load. Therefore, in some situations the computer will be able to receive data at a high rate and in other situations the computer will be able to receive data at a low rate. In some situations transmission of data from the scanner to the computer may be halted for a period of time.

In order to overcome the problems associated with data transfer from the scanner to the computer due to the varying capability of the computer to receive data, a number of methods have been proposed.

A first method suggests that the scanner is provided with an internal buffer that is large enough to hold the entire image representation produced by a scan. The scanning of the original is thereby not affected by the varying capability of the computer to receive data. This method is useful for desktop scanners, but for large format scanners producing images of a size varying from 500 to 1000 megabytes it is not feasible.

A second method suggests that the scanner is operated in intervals, such that the scanner scan at a nominal feed rate while the computer is able to receive data, and when the computer is not able to receive more: data or at least not able to receive data at a maintained data rate, the scanner is halted. However, when the scanner is halted and afterwards when the scanning is resumed, mechanical vibrations caused by displacement means starting abruptly results in distortion of the digital representation of the scanned original. Therefore, this method requires that the scanner is so mechanically stable that no image distortion occurs when the scanner stops and starts. This is possible for slow speed scanners, but for fast scanners that scan at a feed rate larger than 2 inch/second this solution is not feasible.

A third method suggests that the original is initially scanned at a nominal feed rate thereby generating data transferred to the computer at a first data rate. If the computer is not capable of receiving data at this first data rate, the scanning is stopped and then restarted to scan the original at a lower feed rate, thereby generating data transferred to the computer at a second and lower data rate. This is continued until scanning of the entire original succeeds. This method is useful, but it may cause the scanning of an original to take a long time because the scanning is stopped and restarted repeatedly, if a relative low date rate is required for the transfer of data from the scanner to the computer.

SUMMARY OF THE INVENTION

The primary object of the invention is to provide an optical scanner which is capable of stopping and starting scanning even at high feed rates without requiring the scanner to have excessive large internal buffers or to have high mechanical stability, and avoiding time consuming rescans.

There is provided an optical scanner collecting information from an original by means of sweeping scan, said scanner comprising: a line detector for registering intensity information from lines on the original, thereby providing an image signal comprising a succession of line signals; said line detector providing data to a memory; displacement means for displacing the original and said line detector relative to each other at a feed rate; control means for controlling the magnitude of said feed rate; said feed rate being adjusted according to the following rule: if said feed rate is less than a predetermined value and if said memory has capacity for more data, then said feed rate is increased by a value that is a fraction of said predetermined value.

Further, there is provided an optical scanner collecting information from an original by means of sweeping scan, said scanner comprising: a memory; a line detector, said line detector registering intensity information from lines on the original thereby providing an image signal comprising a succession of line signals, said image signal providing data to said memory at a data rate; displacement means for displacing the original and said line detector relative to each other at a feed rate; control means for controlling the magnitude of said feed rate, said feed rate being adjusted according to a procedure comprising a first step: if said memory has capacity for a higher data rate and if said feed rate is less than a preferred value, said feed rate is increased by a value that is a fraction of said preferred value.

Still . . . further, there is provided an optical scanner collecting information from an original by means of sweeping scan, said scanner comprising: a line detector for registering intensity information from lines on the original, thereby providing an image signal comprising a succession of line signals, said image signal being generated at a data rate; displacement means for displacing the original and said line detector relative to each other at a feed rate; a memory; a data processor to convert said image signal into a modified image signal, said data processor reducing the number of line signals from said image signal while said feed rate is below said predetermined value, said modified image signal providing data to said memory; control means for controlling the magnitude of said feed rate, said feed rate being adjusted according to a procedure comprising a first step: if said memory has capacity for a higher data rate and if said feed rate is less then a preferred value, then said feed rate is increased by a value that is a fraction of said preferred value.

It is thereby possible to reduce mechanical vibrations to a non-significant level by slowly raising the feed rate of the scanner until it reaches a nominal scanning speed. It is further possible to reduce the feed rate slowly.

BRIEF DESCRIPTION OF THE DRAWINGS

The invention will be explained more fully below in connection with preferred embodiments and with reference to the drawings, in which.

DETAILED DESCRIPTION OF PREFERRED EMBODIMENTS

Figure 1:
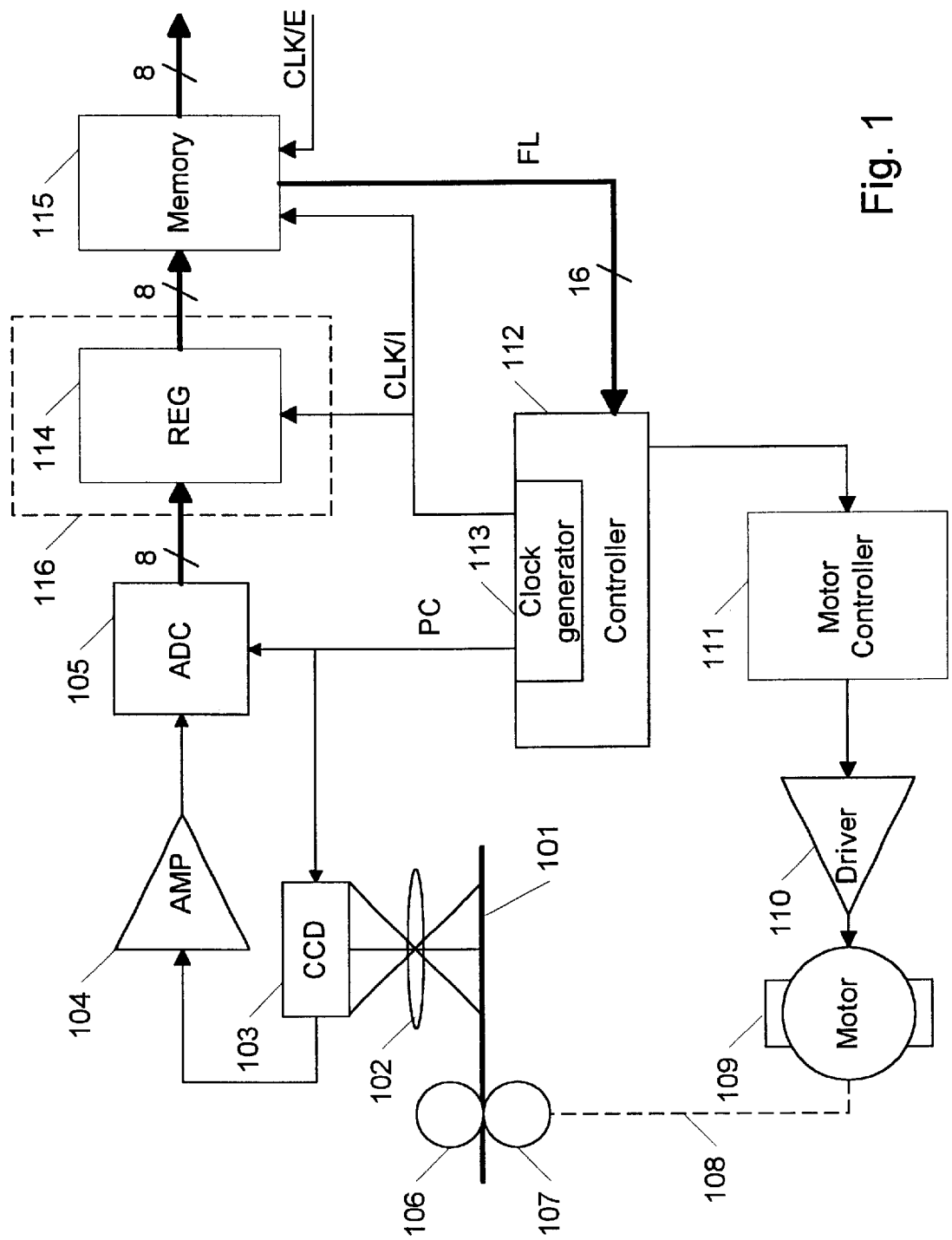
FIG. 1 shows a first embodiment of an optical scanner according to the invention.

FIG. 1 shows a first embodiment of an optical scanner according to the invention. An image of a scan line portion of an original 101 is projected onto the line detector 103, e.g. a charge coupled device (CCD), by means of the optical element 102. The optical element 102 is shown as a lens, but may be in the form of a lens bar or any other suitable optical element In order to scan the original by means of a single line detector 103, the original 101 is moved past the optical element 102 at a velocity or feed rate F [m/sec]. In this embodiment the original 101 is moved by means of displacement means comprising two rollers lot and 107 driven by a motor 109 via a transmission link 108, that may be in the form of a belt drive. The position of the line detector and the optical system is thereby held fixed. Alternatively, the line detector and the optical system may be moved across the (fixed) original. The scanner may ba of the flat bed, roller, drum, or another type.

The line detector 103 comprises cells that provide analogue voltages representing intensity levels from pixels on the original. The analogue voltages are clocked out by using a pixel clock signal PC (comprising clock pulses) provided by a clock generator unit 113 associated with the controller 112 of the scanner. The sequence of analogue voltages is transferred from the array 103 to an amplifier 104 for amplification. The amplified analogue voltages are converted into multi-bit levels, e.g. 8-bit digital values, in an analog to digital converter (ADC) 105. The conversions are controlled by the pixel clock, PC. The analogue voltages or digital values representing intensity levels along a single line Constitute a line signal. A succession of such line signals constitutes an image signal.

The digital values provided by the analog to digital converter 105 are transferred to a register 114 at a data rate determined by the pixel clock, PC. The register 114 is controlled by the internal clock signal CLK/I such that only selected digital values are passed through the register and further on Lo the memory 115. It is thereby possible to reduce the data rate from the register to the memory relative to the data rate from the analog-to-digital converter.

The internal clock signal CLK/I may be generated by selecting every N clock pulse from the pixel clock signal where N is an integer greater than zero. It is thus possible to reduce the data rate by a factor of ½ by selecting every second value, by a factor of ⅓ by selecting every third value, etc.

The memory is thereby filled with data from the register at a rate determined by the CLK/I signal and drained by an external unit (not shown) at a rate determined by an external clock signal CLK/E. If the memory 115, for a period of time, is filled with data faster than the memory is drained, data will accumulate in the memory. However, if the memory does not have capacity for data accumulating during a longer period of time, then the data rate at which the scanner generates data must be slowed down. This is done e.g. by stooping the scanner (i.e. the feed rate is zero) for a period of time lasting until the memory is drained sufficiently. The scanner has thereby capacity for more data.

The controller is able to monitor the fill level of the memory in order to stop the scanner if too much data is accumulated or will accumulate in the memory, and in order to re-start the scanner when the fill level is sufficiently low. The fill level is monitored by means of the signal FL indicating the fill level of the memory. The fill level may be monitored continuously, storage cell by storage cell, or by means of threshold value(s) and binary value(s) indicating whether the fill level is greater than or less than the threshold value(s).

According to the invention the scanner is re-started sufficiently slowly to avoid image distortions caused by mechanical vibrations from the displacement means. The displacement means is driven by means of the motor 109 that is controlled by means of a motor controller 111 via the driver 110. Further, the motor controller 111 is responsive to a feed rate signal determined by the controller 112.

In this embodiment the pixel clock PC has a constant duty cycle and is operated at a constant frequency. The time intervals at which the line detector is exposed to the original is thereby also held constant. The scanned number of lines per unit length on the original, denoted the vertical resolution, is thus determined by the feed rate. If a specific resolution is desired, a corresponding feed rate is determined. This corresponding feed rate is denoted a predetermined feed rate.

While the scanner is operated at a feed rate less than the predetermined feed rate, there ace scanned lines corresponding to a resolution that is higher than the desired resolution. It is borne in mind that the register 114 is operated at the internal clock signal CLK/I thereby selecting chosen lines from the sequence of scanned lines. Thus, despite the fact that the scanner is operated at the reduced feed rate the desired resolution is maintained. However, it is required that feed rate is limited to specific magnitudes corresponding to the possible selectable lines. That is, the feed rate is reduced by fractions ½, ⅓, ¼, etc. of the preferred feed rate. Note that if only every N line is selected, N being a positive integer, the selected lines represent equally spaced lines on the original.

Figure 2:
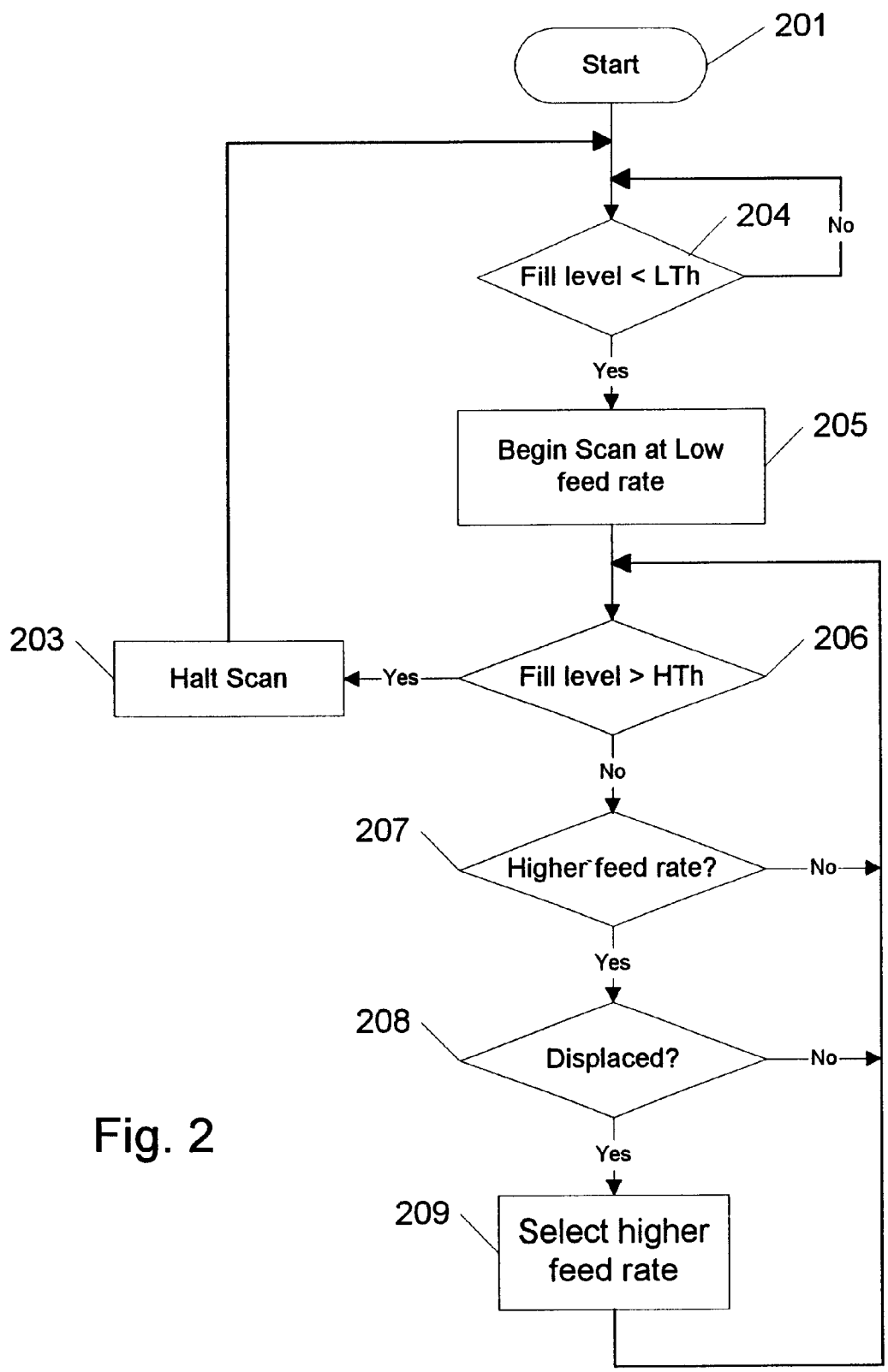
FIG. 2 shows a first flowchart for controlling the feed rate in an optical scanner according to the, invention.

FIG. 2 shows a first flowchart for controlling the feed rate in an optical scanner according to the invention. The flowchart illustrates the function of a program or a part of a program executed by means of the controller 112. In step 201 the scanner is initialised, comprising that the memory 115 is reset. The fill level of the memory 115 or some type of external memory is monitored in step 204 by means of a threshold value LTh. If the fill level is greater than the LTk. threshold, then scanning is not started and there is not transferred data to the memory. Alternatively, if the fill level is less than the LTh threshold, scanning is started in step 205 at a sufficiently low feed rate such that no image disturbances are introduced by the displacement means.

There are thereby generated line signals at a low data rate and the line signals or alternatively line signals modified by a processor are transferred to the memory.

In step 206 the fill level is compared to the HTh threshold. If the fill level exceeds tie HTh threshold, it is determined that it is likely that: the memory will overflow if the feed rate is not reduced. Therefore, in order to avoid a memory overflow, scanning is halted in step 203 and the program resumes at step 204, waiting for the fill level to become less than the LTh threshold.

An alternative decision in step 206 is that the fill level is less than the HTh threshold and it is thus possible to transfer data,. in the form of line signals, to the memory at an increased date rate and at the same time avoid a memory overflow. Thus, in step 207 it is verified whether there is any higher feed rate less than a predetermined feed rate. If there is not a higher feed rate, the program resumes at step 206 by verifying whether the fill level is greater than the HTh threshold; otherwise in step 208 it is verified whether the displacement means has moved the original and the line detector a predefined distance relative to each other. This is done to avoid that the feed rate increases too fast. It the original and the line detector have not been displaced a predefined distance relative to each other, the program resumes at step 206, otherwise the feed rate is increased in step 209 and it is thereby avoided that the feed rate is increased too fast.

Figure 3:
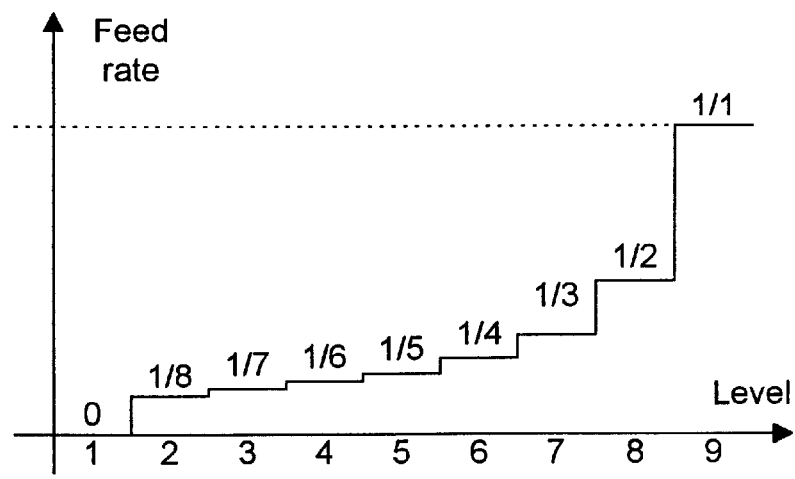
FIG. 3. shows an example of preferred feed rates for an optical scanner.

FIG. 3 shows an example of preferred feed rates for an optical scanner. The feed rate may take nine values corresponding to nine levels. At level one the scanner is halted, at level eight the scanner scans at half speed, and at level nine the scanner scans at a maximal speed or feed rate. Note that a shift from level eight to level nine and vice versa is relative large compared to a shift between any of the other levels.

Figure 4:
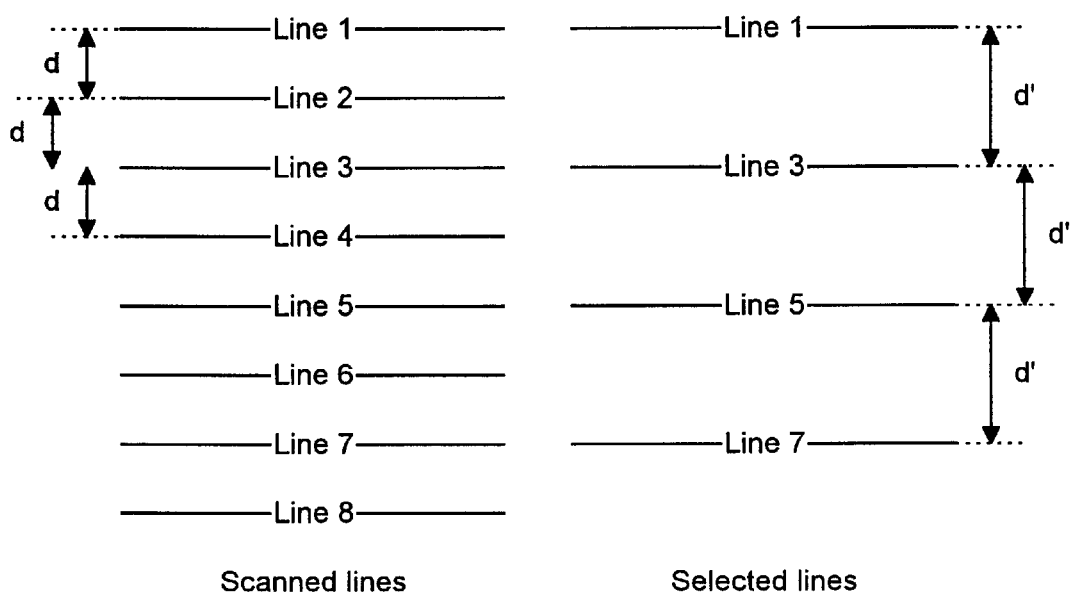
FIG. 4 shows an example of the spatial distribution of scanned lines versus the spatial distribution of selected lines.

FIG. 4 shows an example of the spatial distribution of scanned lines versus the spatial distribution of selected lines. The process of selecting lines may be carried out by means of the processor 116. A line detector generates a succession of line signals; line one, line two, line three, etc., at a first data rate corresponding to a first vertical resolution of scanning. The scanned lines are located at a mutual distance d. If e.g the feed rate takes a value corresponding to level eight in FIG. 3 and a desired resolution of scanning corresponds to feed rate at level nine, the resolution is reduced by selecting every other line signal. The selected line signals comprises therefore the line signals line one, line three, line five, etc., representing scanned lines located at a mutual distance d'.

Likewise, every third, fourth, fifth, etc. line signal may be selected in order to convert the line signals corresponding to a scanned resolution into line signals corresponding to a desired resolution.

Figure 5:
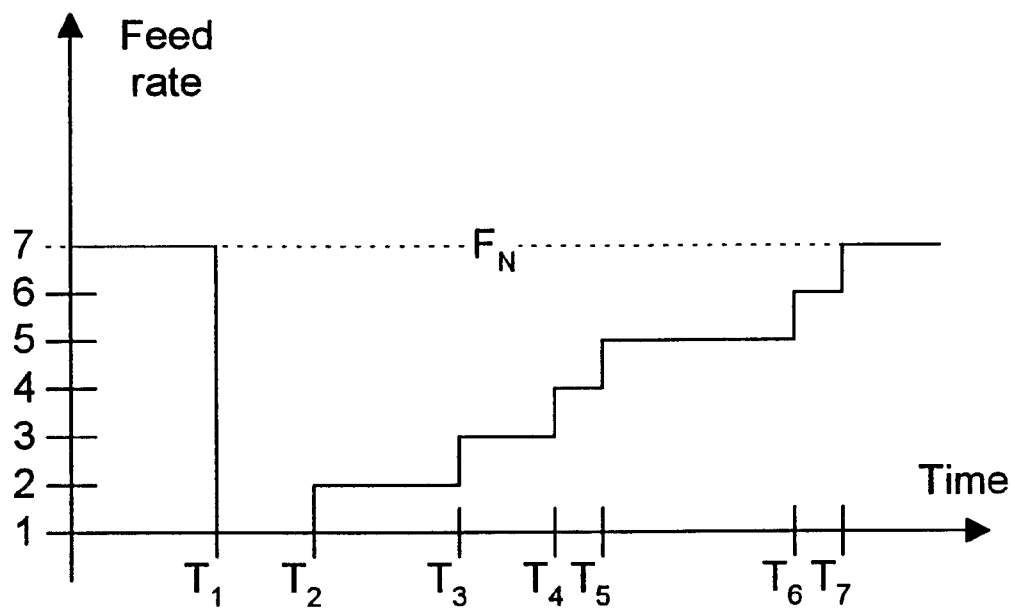
FIG. 5 shows an example of up-ramping.

FIG. 5 shows an example of up-ramping. This example shows the selected level of feed rate as a function of time. At a point in time $T_1$, the scanning at a nominal feed rate $F_N$ is abruptly halted, i.e. level one is selected. Later, at a point in time $T_2$ when the scanning may resume the feed rate is set at level two. Still later, at a point in time $T_3$ it is determined that the feed rate may be increased again to level three. This process is continued until the nominal feed rate $F_N$ is reached. Image distortions due to abruptly starts of the scanner are thereby avoided. The specific points in time $T_1$, $T_2$, $T_3$, etc., may depend on the actual state of the scanner or the state of the system the scanner is connected to. Alternatively the specific points in time may be located mutually in time such that the up-ramping procedure follows a predetermined ramp.

Figure 6:
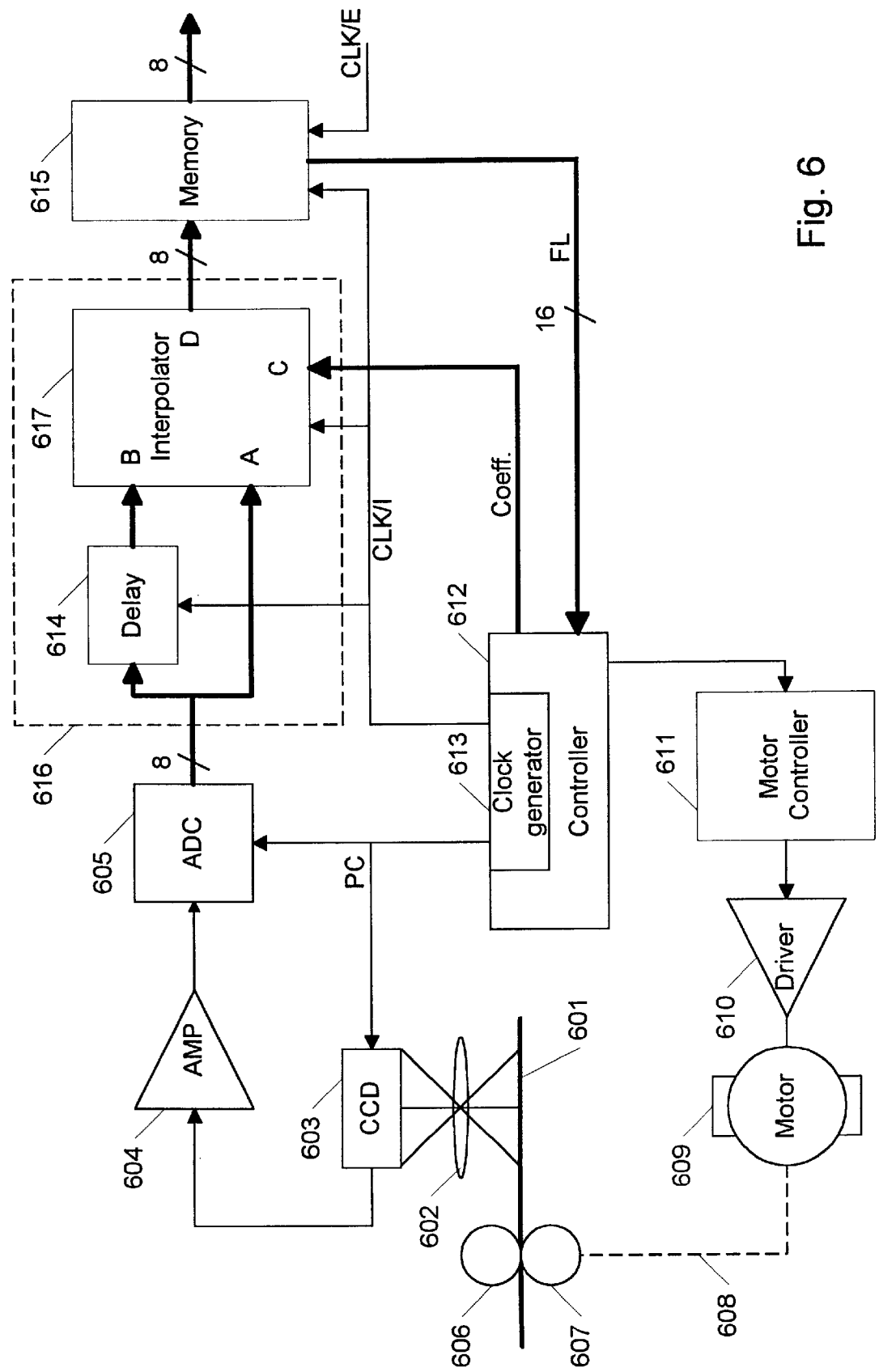
FIG. 6 shows a second embodiment of an optical scanner according to the invention.

FIG. 6 shows a second embodiment of a: optical scanner according to the invention. An image of a scan line portion of an original 601 is projected onto the line detector 603, e.g. a charge coupled device (CCD), by means of the optical element 602. In order to scan the original by means of a single line detector 603, the original 601 is moved past the optical element 602 at a velocity or feed rate F [m/sec]. In this embodiment the original 601 is moved by means of displacement means comprising two rollers 606 and 607 driven by a motor 609 via a transmission link 608, that may be in the form of a belt drive.

The line detector 603 comprises cells that provide analogue voltages representing intensity levels from pixels on the original. The analogue voltages are clocked out by use of a pixel clock signal PC (comprising clock pulses) provided by a clock generator unit 613 associated with the controller 612 of the scanner. The sequence of analogue voltages is transferred from the array 603 to an amplifier 604 for amplification. The amplified analogue voltages are converted into multi-bit levels or 8-bit digital values in an analog to digital converter (ADC) 605. The conversions are controlled by the pixel clock, PC.

The digital values provided by the analog to digital converter 605 transferred via a multi-bit data bus which is branched, so that the signal is passed to the A input on the interpolator 617 as well as to a buffer 614 in the form of a first-in-first-out (FIFO) memory. The FTFO memory is operated such that the input values are delayed a number of clock pulses corresponding to the number of pixel in a scanned line. Data are written from the memory 614 and are transferred via an 8-bit database to the B input on the interpolator 617. Thus, two associated pixel values for two consecutive lines are transferred to the A input and the B input on the interpolator 617. The interpolator simultaneously receives a 4-bit interpolation value from the controller 612 via the C input, while said interpolator receives the pixel values on the A and B gates.

The interpolator 617 supplies an output signal D, and this output signal is calculated by means of an algorithm stored in the interpolator 617. This algorithm may be expressed as follows:

$$D=(A(16-C)+CB)/16$$

wherein B and A are the actual pixel values of the last-read scan line and the next-to-the-last-read scan line, while C is the interpolation coefficient, Ic, calculated in response to the desired resolution and the actual feed rate. The interpolation coefficient can be viewed as a fraction of the distance between the next-to-the-last-read scan line and the last-read scan line. The output D is then a linear interpolated value, interpolated at a distance C relative to the location of A and towards the location of B. Alternatively, a higher order interpolation may be used.

The memory 615 is controlled by the internal clock signal CLK/I such that only valid values from the interpolator 617 are stored in to the memory 615. Thus, the memory is filled with data from the interpolator 617 at a rate determined by the CLK/I signal and drained by an external unit (not shown) at a rate determined by an external clock signal CLK/E. The controller is able to monitor the fill level of the memory by means of the signal FL indicating the fill level of the memory.

The displacement means is driven by means of the motor 609 that is controlled by means of a motor controller 611 via the driver 610. Further, the motor controller 611 is responsive to a feed rate signal determined by the controller 612.

The internal clock signal CLK/I may be generated relative to the pixel clock and the actual feed rate such that the desired resolution is obtained. It is thereby possible to maintain a desired resolution over the entire original despite that the feed rate is reduced. Note that in this embodiment the feed rate may be reduced freely, because by means of the interpolator 617, it is possible to calculate estimated lines that are spatially equally distributed and that are not restricted to the spatial distribution of actually scanned lines.

Figure 7:
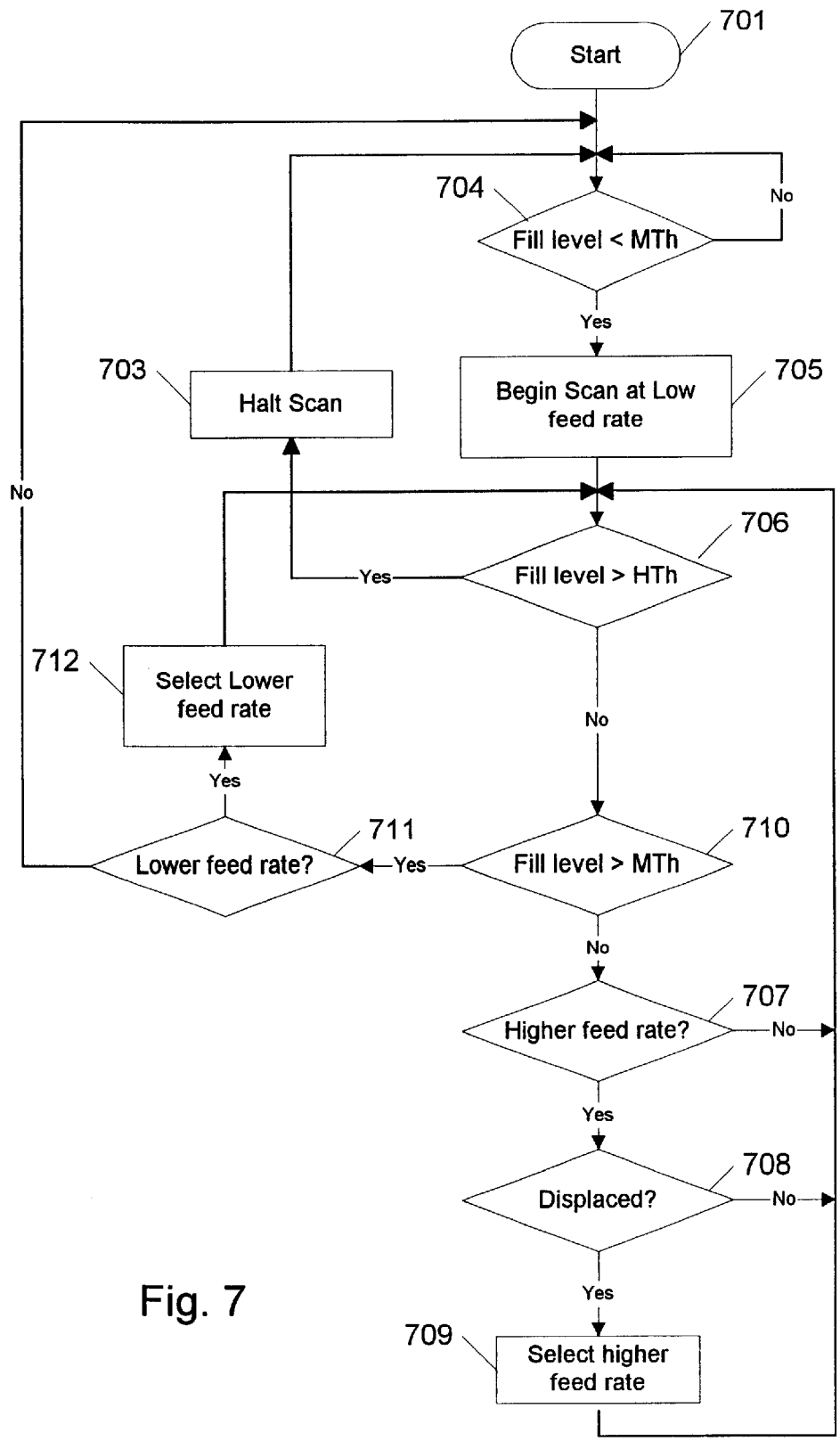
FIG. 7 shows a second flowchart for controlling the feed rate in an optical scanner according to the invention.

FIG. 7 shows a flowchart for controlling the feed rate in an optical scanner according to the invention. The flowchart illustrates the function of a program or a part of a program executed by means of the controller 112; 612. In step 701 the scanner is initiailised, comprising that the memory 115; 615 is reset. The fill level of the memory 115; 615 or some type of external memory is monitored in step 704 by means of a threshold value MTh. If the fill level is greater than the MTh threshold, then scanning is not started and there is not transferred data to the memory. Alternatively, if the fill level is less than the MTh threshold, scanning is started in step 705 at a sufficiently low feed rate such that no image disturbances are introduced by the displacement means. There is thereby generated line signals at a low data rate and the line signals or alternatively line signals modified by a processor are transferred to the memory.

In step 706 it is verified whether the fill level exceeds the HTh threshold. If the fill level exceeds the HTh threshold, the program halts the scanner in step 703. Otherwise, if the fill level does not exceed the HTh threshold, it is verified in step 710 whether the fill level exceeds the MTh threshold. If the fill level exceeds the MTh threshold, the fill level will probably result in a memory overflow at the current feed rate. Alternatively, if the fill level is less than the MTh threshold, it will probably be possible to increase the feed rate without causing a memory overflow.

If the fill level is less than MTh, (in step 707) it is verified whether there is any higher feed rate less than a predetermined feed rate. If there is no such higher feed rate, the program resumes in step 706 by verifying whether the fill level exceeds the HTh threshold, otherwise it is verified in step 708 whether the displacement means has moved the original and the line detector a predefined distance relative to each other. This is done to avoid that the feed race to be increases too fast. If the original and the line detector have not been displaced a predefined distance relative to each other, the program resumes in step 706, otherwise in step 709 the feed rate is increased. It is thereby avoided that the feed rate is increased too fast.

Alternatively, if the fill level is greater than MTh, it is verified in step 711 whether there is any lower feed rate. If there is a lower feed rate, such lower feed rate is selected in step 712, and in step 706 it is verified whether this lower feed rate results in that the fill level exceeds the HTh threshold. If there is no such lower feed rate i.e. the scanner is stopped, the program resumes in step 704 waiting for the fill level to become less than the MTh threshold.

Preferably, the fill level is monitored by means of a multi-bit address value indicating how much of the memory is occupied. Further, the threshold LTh may represent a low degree of filling, the threshold MTh may represent a medium degree of filling, and HTh may represent a relatively high degree of filling.

Figure 8:
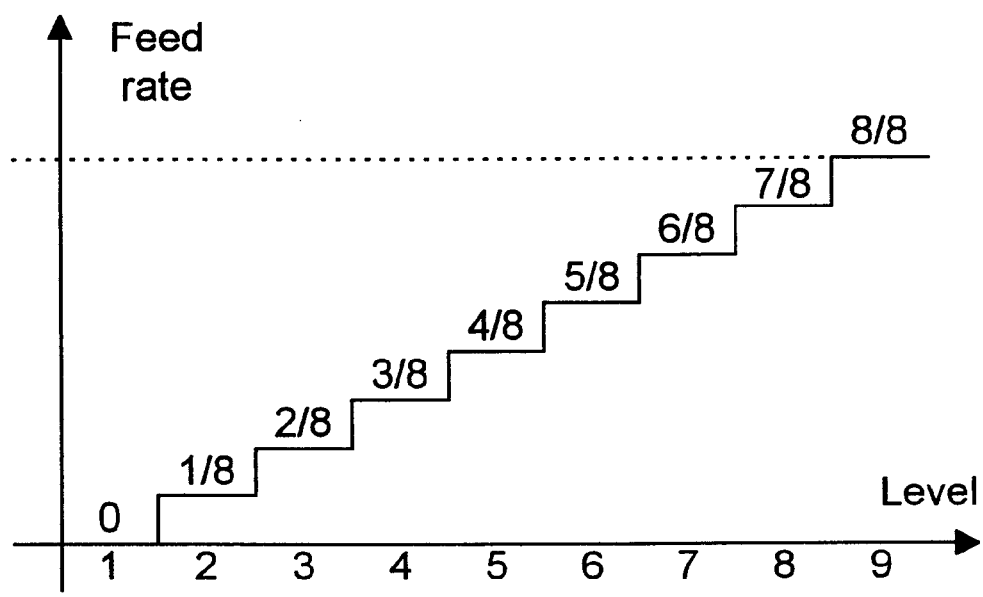
FIG. 8 shows an example of preferred feed rates for an optical scanner.

FIG. 8 shows an example of preferred feed rates. The feed rate may take nine values corresponding to nine levels. At level 1 the scanner is halted and at level nine the scanner scans at a maximal speed or feed rate. Note that the intermediate feed rates are distributed equally between the maximal and minimal feed rate. It is thus possible so to reduce the difference in feed rate between two levels to a sufficiently low value, such that image distortions are avoided.

Figure 9:
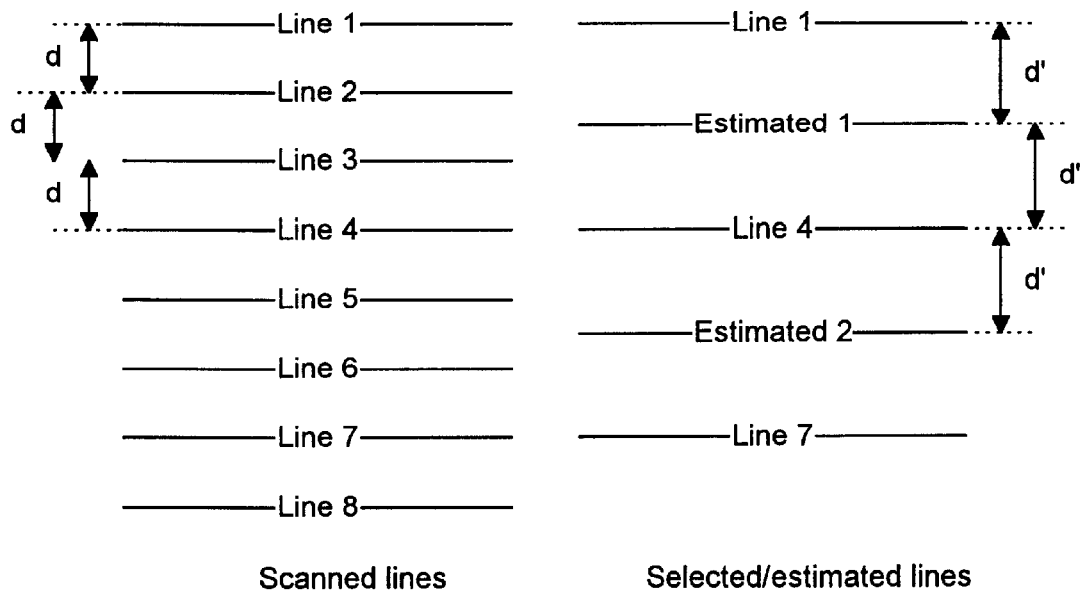
FIG. 9 shows an example of the spatial distribution of scanned lines versus the spatial distribution of estimated/ selected lines.

FIG. 9 shows an example of the spatial distribution of scanned lines versus the spatial distribution of estimated/selected lines.

The process of estimating/selecting lines may be carried out by means of the processor 616. A line detector generates a succession of line signals line one, line two, line three, etc., at a first data rate corresponding to a first vertical resolution of scanning. The scanned lines are located at a mutual distance d. The selected and estimated line signals comprise the line signals line one, estimated one, line four, estimated two, etc. The line signal estimated one is based or the scanned line signals line two and three and the line signal estimated two is based on the scanned line signals line five and six. The selected and estimated line signals represent lines on the original located at a mutual distance d'. There are thereby provided line signals at a slower data rate representing a desired resolution.

Figure 10:
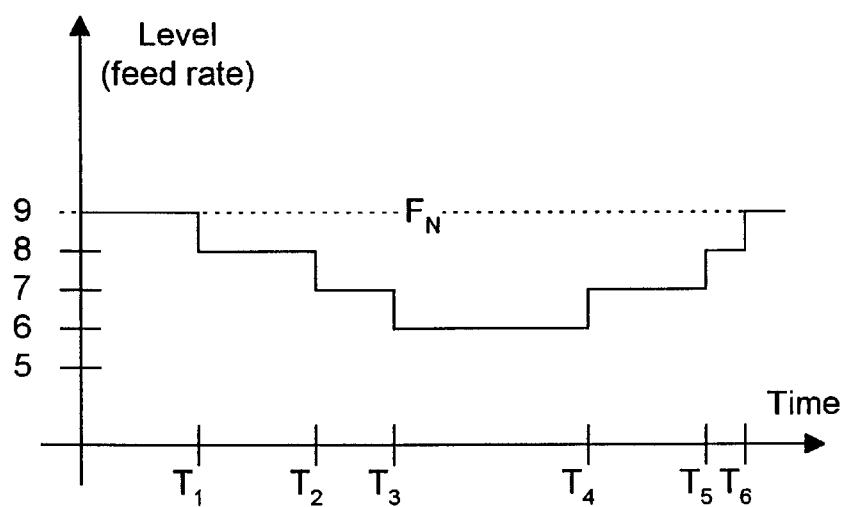
FIG. 10 shows an example of up- and down-ramping.

FIG. 10 shows an example of up- and down-ramping. This example shows the selected level of feed rate as a function of time. At a point in time $T_1$, the scanning at a nominal feed rate $F_N$ is shifted one level down, i.e. level eight is selected. Later, at points in time $T_2$ and $T_3$, the feed rate is further shifted one level down. During the time interval $T_3$–$T_4$, the scanning is carried out at level six. However, at a point of time $T_4$ it is determined that the feed rate may be increased again to level seven. Later, at points in time $T_5$ and $T_6$, it is determined that the feed rate may be increased and the nominal feed rate $F_N$ is reached again.

Image distortions due to abrupt starts of the scanner are thereby avoided. The specific points in time $T_1$, $T_2$, $T_3$, etc., may depend on the actual state of the scanner or the state of the system to which the scanner is connected. Alternatively the specific points in time may be located in time relative to each other such that the up- and down-ramping procedures follow predetermined ramps.

Figure 11:
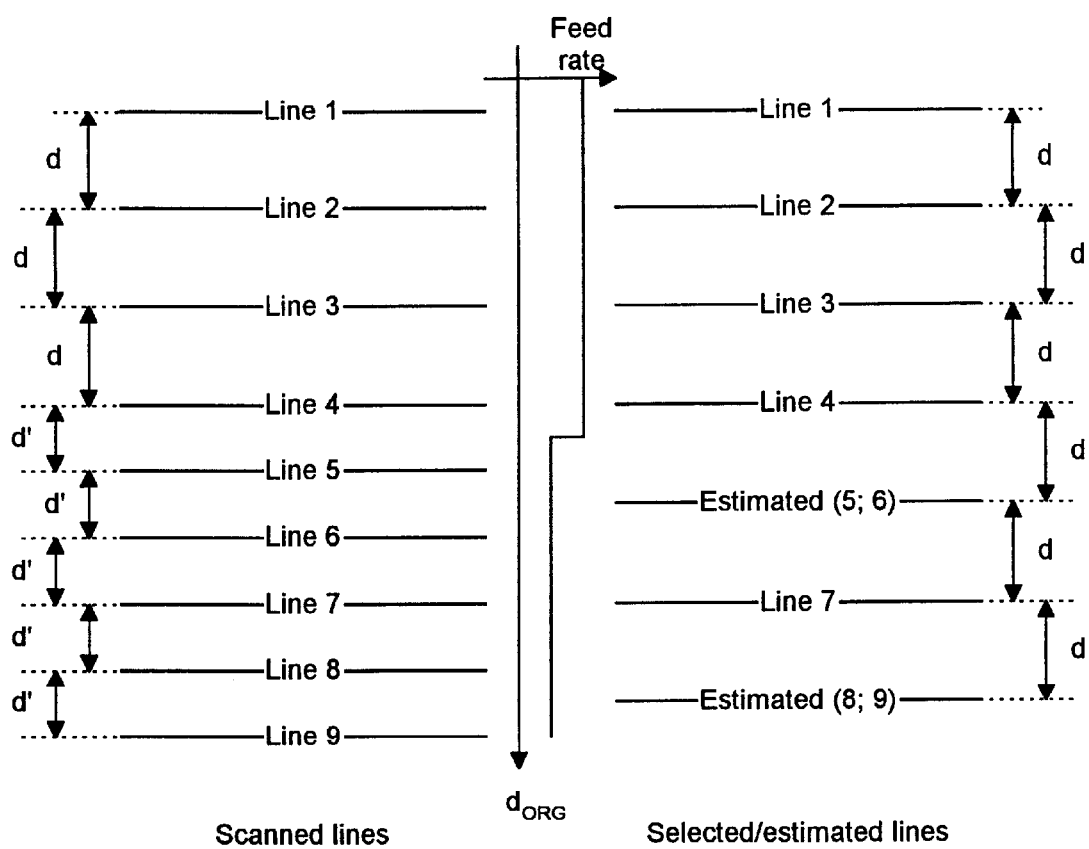
FIG. 11 shows an example of the spatial distribution of scanned lines at two different feed rates versus the spatial distribution of estimated/selected lines.

FIG. 11 shows an example of the spatial distribution of scanned lines at two different feed rates versus the spatial distribution of estimated/selected lines. The step function shown between the scanned lines and the selected/estimated line shows the feed rate as a function of the scanned distance $d_{ORG}$ on the original. The scanned lines, line one, line two, line three, and line four are scanned at a first nominal feed rate with the result that the mutual distance between the scanned lines is d. However, the scanned lines, line five, line six, line seven etc., are scanned at a reduced feed rate resulting in a reduced mutual distance d' between the scanned lines. The object of the processor 616 is to maintain the resolution of scanning at the nominal feed rate allthough the feed rate is reduced, i.e. the mutual distance d between the estimated/selected lines is maintained.

What is claimed is:

1. An optical scanner collecting information from an original by means of sweeping scan, said scanner comprising:
   a line detector for registering intensity information from lines on the original, thereby providing an image signal comprising a succession of line signals; said line detector providing data to a memory;
   displacement means for displacing the original and said line detector relative to each other at a feed rate;
   control means for controlling the magnitude of said feed rate during scanning; said feed rate being a fraction $1/N$ of a predetermined value, wherein N is an integer greater than or equal to 1, said feed rate being adjusted according to the following rule: if said feed rate is less than said predetermined value and if said memory has capacity for more data as monitored during scanning, then said feed rate is increased during scanning such that N is decreased by one.

2. An optical scanner according to claim 1, wherein said feed rate is increased in successive steps.

3. An optical scanner according to claim 1, wherein said steps have a duration corresponding to a predefined relative displacement of the original and said line detector.

4. An optical scanner according to claim 1, further comprising a data processor arranged between said line detector and said memory to convert said image signal into a modified image signal; said data processor reducing the number of line signals from said image signal while said feed rate is below said predetermined value.

5. An optical scanner according to claim 4, wherein said data processor includes a register for selecting line signals from said image signal; the selected lines representing equally spaced lines on the original.

6. An optical scanner according to claim 4, wherein said data processor includes an interpolator for calculating estimated line signals and providing these signals as a modified image signal based on said image signal; said estimated lines representing equally spaced lines on the original.

7. An optical scanner collecting information from an original by means of sweeping scan, said scanner comprising:
   a line detector for registering intensity information from lines on the original, thereby providing an image signal comprising a succession of line signals; said image signal being generated at a data rate;
   displacement means for displacing the original and said line detector relative to each other at a feed rate;
   a memory;
   a data processor to convert said image signal into a modified image signal, said data processor reducing the number of line signals from said image signal while said number of line signals from said image signal while said feed rate is below said predetermined value, said modified image signal providing data to said memory;
   control means for controlling the magnitude of said feed rate during scanning, said feed rate being a fraction $1/N$ of a preferred value, wherein N is an integer greater than or equal to 1, said feed rate being adjusted according to a procedure comprising a first step: if said memory has capacity for a higher data rate as monitored during scanning and if said feed rate is less than said preferred value, said feed rate is increased during scanning such that N is decreased by one.

8. An optical scanner according to claim 7, wherein said feed rate is increased in successive steps.

9. An optical scanner according to claim 8, wherein said steps have a duration corresponding to a predefined relative displacement of the original and said line detector.

10. An optical scanner according to claim 7, wherein said data processor includes a register for selecting line signals from said image signal; the selected lines representing equally spaced lines on the original.

11. An optical scanner according to claim 7, wherein said data processor includes an interpolator for calculating estimated line signals and providing these signals as a modified image signal based on said image signal, said estimated lines representing equally spaced lines on the original.

12. An optical scanner according to claim 7, wherein said memory is drained via a connection to an external unit.

13. An optical scanner according to claim 7, wherein said controller includes a comparator for comparing the actual fill level of said memory to a threshold value, said comparator providing a signal for determining whether said memory has capacity for more data.

14. An optical scanner according to claim 7, wherein said procedure further comprises a second step: if said memory does not have capacity for a maintained feed rate, said feed rate is decreased.

15. An optical scanner according to claim 14, wherein said feed rate is decreased by a value that is a fraction of said predetermined value.

16. An optical scanner collecting information from an original by means of sweeping scan, said scanner comprising:
    a memory;
    a line detector, said line detector registering intensity information from lines on the original, thereby providing an image signal comprising a succession of line signals, said image signal providing data to said memory at a data rate;
    displacement means for displacing the original and said line detector relative to each other at a feed rate;
    control means for controlling the magnitude of said feed rate during scanning, said feed rate being a fraction $1/N$ of a preferred value, wherein N is an integer greater than or equal to 1, said feed rate being adjusted according to a procedure comprising a first step: if said memory has capacity for a higher data rate as monitored during scanning and if said feed rate is less than said preferred value, said feed rate is increased during scanning such that N is decreased by one.

17. An optical scanner according to claim 16, wherein said feed rate is increased in successive steps.

18. An optical scanner according to claim 17, wherein said steps have a duration corresponding to a predefined relative displacement of the original and said line detector.

19. An optical scanner according to claim 16, further comprising a data processor arranged between said line detector and said memory to convert said image signal into a modified image signal, said data processor reducing the number of line signals from said image signal while said feed rate is below said predetermined value.

20. An optical scanner according to claim 19, wherein said data processor includes a register for selecting line signals from said image signal; the selected lines representing equally spaced lines on the original.

21. An optical scanner according to claim 19, wherein said data processor includes an interpolator for calculating estimated line signals and providing these signals as modified image signals based on said image signal; said estimated lines representing equally spaced lines on the original.

22. An optical scanner according to claim 16, wherein said memory is drained via a connection to an external unit.

23. An optical scanner according to claim 16, wherein said controller includes a comparator for comparing the actual fill level of said memory to a threshold value, said comparator providing a signal for determining whether said memory has capacity for more data.

24. An optical scanner according to claim 16, wherein said procedure further comprises a second step: if said memory does not have capacity for a maintained feed rate then said feed rate is decreased.

25. An optical scanner according to claim 24, wherein said feed rate is decreased by a value that is a fraction of said predetermined value.

26. An optical scanner according to claim 1, wherein said control means monitors a fill level of said memory to determine whether said memory has capacity for more data.

27. An optical scanner according to claim 1, wherein said control means adjusts said feed rate step-wise either up or down.

28. An optical scanner according to claim 7, wherein said control means monitors a fill level of said memory to determine whether said memory has capacity for a higher data rate.

29. An optical scanner according to claim 7, wherein said control means adjusts said feed rate step-wise either up or down.

30. An optical scanner according to claim 16, wherein said control means monitors a fill level of said memory to determine whether said memory has capacity for a higher data rate.

31. An optical scanner according to claim 16, wherein said control means adjusts said feed rate step-wise either up or down.

* * * * *

UNITED STATES PATENT AND TRADEMARK OFFICE
CERTIFICATE OF CORRECTION

PATENT NO.    : 6,262,816 B1
DATED         : July 17, 2001
INVENTOR(S)   : Rindsig et al.

It is certified that error appears in the above-identified patent and that said Letters Patent is hereby corrected as shown below:

<u>Title page,</u>
Item [73], Assignee: "Context A/S," should read -- Contex A/S, --

Signed and Sealed this

Sixth Day of August, 2002

*Attest:*

*Attesting Officer*

JAMES E. ROGAN
*Director of the United States Patent and Trademark Office*